(12) United States Patent
Vion

(10) Patent No.: US 6,277,285 B1
(45) Date of Patent: Aug. 21, 2001

(54) PROCESS FOR THE CLARIFICATION OF LIQUIDS AND SUSPENSIONS

(75) Inventor: Patrick Vion, Houilles (FR)

(73) Assignee: Degremont S.A., Rueil Malmaison (FR)

( * ) Notice: Subject to any disclaimer, the term of this patent is extended or adjusted under 35 U.S.C. 154(b) by 0 days.

(21) Appl. No.: 09/519,882

(22) Filed: Mar. 6, 2000

(30) Foreign Application Priority Data

Dec. 3, 1999 (FR) .................................................... 99 15301

(51) Int. Cl.[7] ....................................................... C02F 1/56
(52) U.S. Cl. ......................... 210/709; 210/711; 210/713; 210/714; 210/745
(58) Field of Search ................................... 210/709, 711, 210/713, 714, 725, 727, 728, 738, 745, 96.1

(56) References Cited

U.S. PATENT DOCUMENTS

| | | | |
|---|---|---|---|
| 4,388,195 | * | 6/1983 | von Hagel et al. .................. 210/709 |
| 4,579,655 | * | 4/1986 | Louboufin et al. ................ 210/195.3 |
| 4,927,543 | * | 5/1990 | Bablon et al. ........................ 210/711 |
| 4,997,573 | * | 3/1991 | Browne ................................ 210/714 |
| 5,039,428 | * | 8/1991 | Wentzler et al. ..................... 210/711 |
| 5,730,864 | * | 3/1998 | Delsalle et al. .................... 210/195.1 |
| 5,770,091 | * | 6/1998 | Binot et al. ........................... 210/711 |
| 5,800,717 | * | 9/1998 | Ramsay et al. ....................... 210/711 |
| 5,916,447 | * | 6/1999 | Hulten et al. ......................... 210/709 |

* cited by examiner

*Primary Examiner*—Peter A. Hruskoci
(74) *Attorney, Agent, or Firm*—Connolly Bove Lodge & Hutz

(57) ABSTRACT

Process employing the technique of ballasted flocculation with a step of injection, into the liquid to be clarified, of a ballast consisting of a granular material and of a polymer, followed by a flocculation step which leads to the formation of a ballasted floc, and by an accelerated settling step, said ballast being recirculated into the flocculation step, either as it is or after cleaning, wherein said process includes two recirculation regimes:

a high-energy regime ensuring draw-off of the ballast contained in the ballasted floc, removal of the floc in the form of sludge and recycling of the cleaned ballast into the flocculation unit and, a low-energy regime ensuring transfer of the ballasted floc into the flocculation unit as long as the ballast ratio in the flocculator is greater than a predetermined level, this low-energy regime remaining in service while the high-energy regime is being put into action, but then being shut down during the operation of the high-energy regime, the two systems being employed alternately so as to maintain the ballast ratio at a predetermined level.

5 Claims, 5 Drawing Sheets

PROCESS FOR THE CLARIFICATION OF LIQUIDS AND SUSPENSIONS

FIELD OF THE INVENTION

The present invention relates to a process and a plant for the clarification of liquids and suspensions by flocculation and settling.

BACKGROUND OF THE INVENTION

A process for the clarification treatment of municipal sewage or industrial wastewater, potable water, process water or wastewater, which employs a ballasted flocculation technique. The treatment consists of injecting, into the water to be treated, a contacting medium (consisting of a granular material, such as sand) and a polymer and then in carrying out a flocculation step which is accelerated by this contacting medium and this polymer. This is followed by a settling step. The sand, after it has been separated from the sludge and cleaned, is recirculated into the flocculation step. An example of how such a process is employed is described in particular in FR-A-1,411,792.

This known process has effectively the advantage of accelerating the flocculation, thereby making it possible to achieve a relatively large reduction in the residence time of the water to be treated, in the flocculation phase, of about 2 to 8 minutes. Moreover, this process makes it possible to achieve very high settling velocities (greater than 15 m/h), these velocities possibly being as high as and even exceeding 100 meters/hour when accelerated settling with lamellar modules is employed. In addition, the plants can be started up quickly (in approximately ten minutes) because of the immediate availability of the granular material in the settling unit.

However, experience shows that this process has a number of drawbacks which are summarized below:

1. High Electrical Consumption

The sand/sludge separation which takes place using a hydrocyclone consumes a great deal of energy. Furthermore, the operation of the hydrocyclone cannot be adjusted according to the flow rate or the quality of the raw water. This is because the hydrocyclone cannot be shut down, since taking it out of service would cancel out the flocculation and the settling; in addition, the hydrocyclone-type systems for cleaning the granular material must, in order to ensure stable flocculation and simply because of their principle, be used with a fixed throughput, with a continuous influx of polymer and granular material: they are therefore sized to the maximum throughput and to the maximum material loading of the settling station. As a result, the electrical consumption, per $m^3$ of treated liquid, is obviously higher for the low throughputs and for water with a low content of suspended matter.

2. Management of Plant Shut-downs

Moreover, the systems described at the present time mean that, during shut-down periods, the granular material does not reside at the bottom of the settler but is transferred into the flocculator: there is in fact a high risk, when restarting the plant, of blocking the scraper of this settler (if the granular material remains on the floor) or the hydrocyclone (blockage of the hydrocyclone and/or loss of sand at the overflow are inevitable when the concentration of granular material in the draw-off hopper is high). It is then necessary to transfer the sand either to the flocculator, the propeller, which has to be oversized in order to ensure that the sand is resuspended, or to a specific tank having high-energy stirring means.

3. Pipe Blockage

In conventional systems (especially FR-A-2,719,234), it is also necessary, in order to avoid as far as possible blockages of the draw-off circuit, to position the pump or pumps for drawing off the ballasted floc as close as possible to the central draw-off region of the settler. This implies the construction of a service duct below the floor of the said settler and the fitting of long horizontal and vertical pipes, which are always sensitive to blocking. These requirements considerably increase the construction and running costs of the conventional plants.

4. Low Sludge Concentration

The very principle of the hydrocyclone entails a high loss of water (which may amount to 3 to 20% of the throughput actually treated in the plant) and, as a corollary, the production of diluted sludge at the overflow of the said hydrocyclone; the sludge dilution is greater the smaller the throughput treated, or the lower the content of suspended matter in the raw water. The concentration obtained is about 0.1 to 2 grams per liter in the case of the clarification of surface water.

On account of the drawbacks of this prior art, the objectives of the present invention were especially to solve the following problems:

- to decrease the energy consumption, particularly for low throughput or in the case of a low content of suspended matter in the influent liquid;
- to manage the shut-down and restart periods of the settler and to eliminate the risks of blockage;
- to limit the loss of water with respect to the total throughput treated by the plant and to obtain sludge having a high concentration (for example, greater than 2 grams per liter in the case of the clarification of surface water);
- to reduce the set-up and running costs by dispensing with the pumps (and therefore the services ducts) located beneath the floor of the settlers and to simplify the running of the plants employing the technique of ballasted flocculation.

In the description which follows, the following terminology has been adopted:

"ballast": the granular material (for example sand), either fresh or recycled after cleaning the ballasted floc; during the first operation of the plant, all the ballast is introduced into the "flocculator-settler" equipment and, subsequently, the injection of fresh ballast will only be exceptional, for example to compensate for losses that are liable to occur or as a result of accidents);

"ballasted floc": the agglomerate consisting of the ballast, the polymer and the particles which have to be removed from the liquid during clarification;

"sludge": the residue obtained after the ballasted floc has been cleaned (and after the clean ballast has been recovered), for example at the overflow of the hydrocyclone;

"ballast ratio": the proportion, expressed as a percentage, clean ballast/(total ballast+sludge), measured in the flocculator; a value of 90% corresponds to a "dirty" ballast, laden with sludge to an amount of 10% of its weight, whereas a ballast ratio of 99% (and higher) corresponds to a clean ballast.

BRIEF DESCRIPTION OF THE INVENTION

Consequently, the subject of this invention is a process for the clarification treatment of liquids and suspensions, particularly of municipal sewage or industrial wastewater, potable water, process water or wastewater, employing the technique of ballasted flocculation with a step of injection, into the liquid to be clarified, of a contacting medium or ballast consisting of a granular material, such as particularly sand, and of a polymer, followed by a flocculation step which leads to the formation of the ballasted floc and ends in an accelerated settling step, the ballasted floc being recirculated into the flocculation step, either as it is or after cleaning, this process being characterized in that it includes two recirculation regimes:

- a high-energy regime, ensuring draw-off of the ballast contained in the ballasted floc (and therefore, for example, separation of the sand from the sludge), removal of the floc in the form of sludge and recycling of the cleaned ballast into the flocculation unit and,
- a low-energy regime ensuring transfer of the ballasted floc into the flocculation unit as long as the ballast ratio in the flocculator is greater than a predetermined level, this low-energy regime remaining in service while the high-energy regime is being put into action, but then being shut down during the operation of the high-energy regime, the two systems being employed alternately so as to maintain the ballast ratio at a predetermined level.

According to the present invention, the low-energy regime is used systematically for any start-up or restart-up of the plant, so as to recirculate the ballast or the ballasted floc.

According to the present invention, a step may furthermore be provided for continuously measuring the ballast ratio.

The subject of the present invention is also a plant for implementing the process specified above, which includes a flocculator, through which the liquids or suspensions to be clarified, the ballast or ballasted floc and the polymer pass, and a settler, the plant being characterized in that it includes:

- a low-energy system consisting of a recirculation tube placed in the central region for taking up the ballasted floc in the settler which can be of conical or cylindroconical shape or have a flat and scraped bottom, one of the ends of the tube being positioned in the immediate vicinity of the bottom of the settler, and of a means for pumping the ballasted floc through the tube in order to deliver it to the flocculator when the ballast ratio in the latter is above the said predetermined level, and
- a high-energy system which comprises, for example, a hydrocyclone and a suction pipe feeding the hydrocyclone, drawing off the ballasted floc at the bottom of the settler, in the same region as the recirculation tube of the low-energy system, the hydrocyclone ensuring, as is known, separation of the ballast with the sludge and its recycling to the flocculator.

Further features and advantages of the present invention will emerge from the description given below, with reference to the appended drawings which illustrate various embodiments of the invention without them having any limiting character.

DETAILED DESCRIPTION

Figure 1:
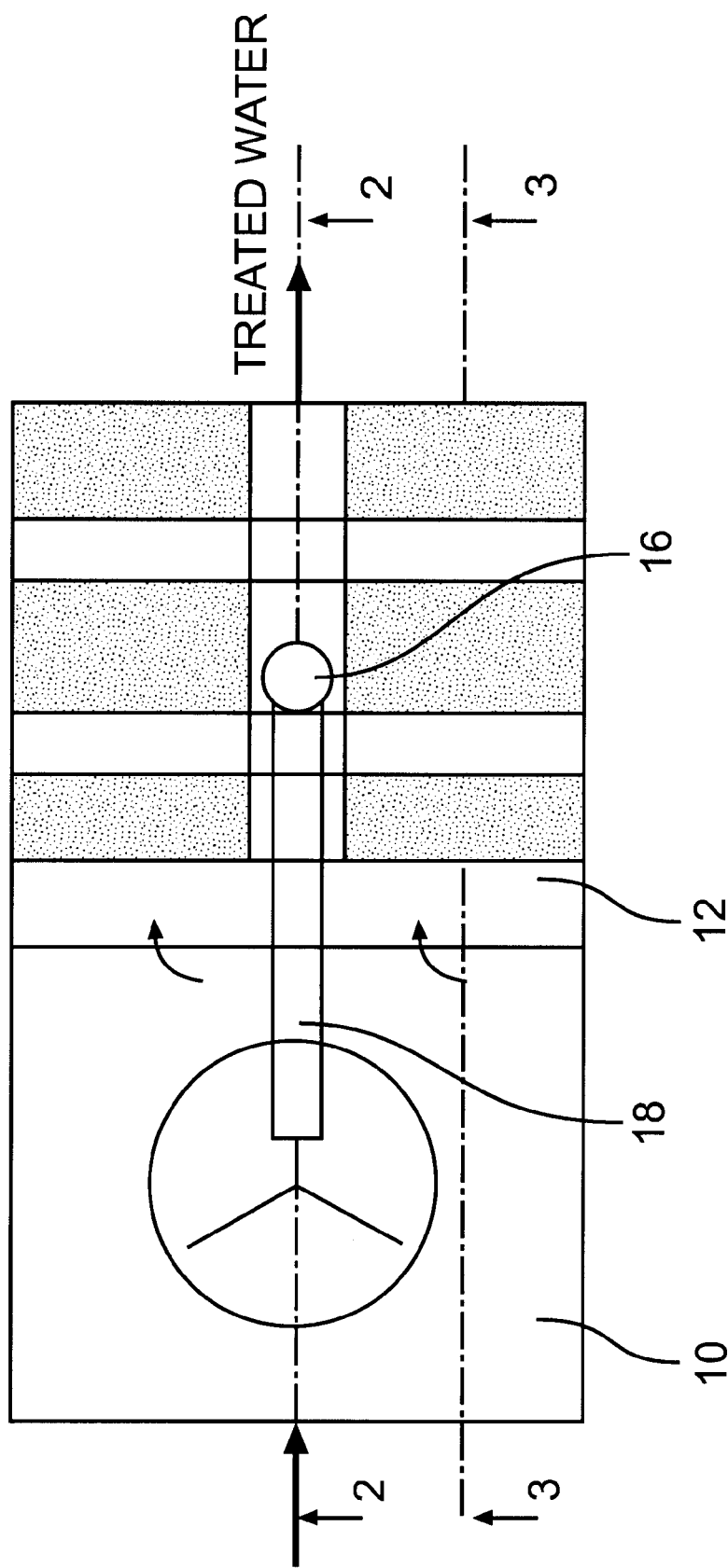
FIG. 1 is a schematic plan view of a first embodiment of the invention.
Figure 2:
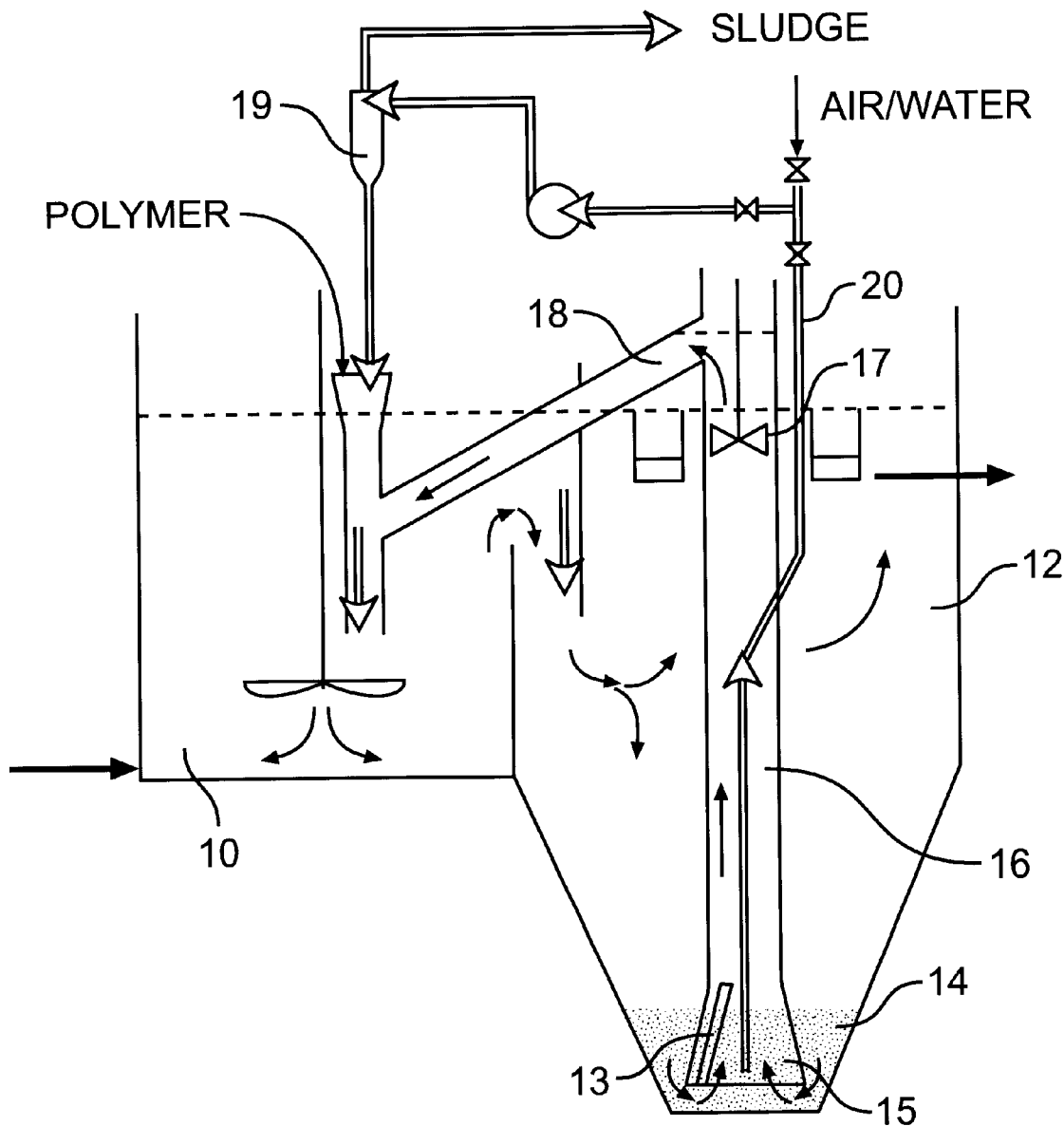
FIG. 2 is a cross-sectional view along 2—2 in FIG. 1.
Figure 3:
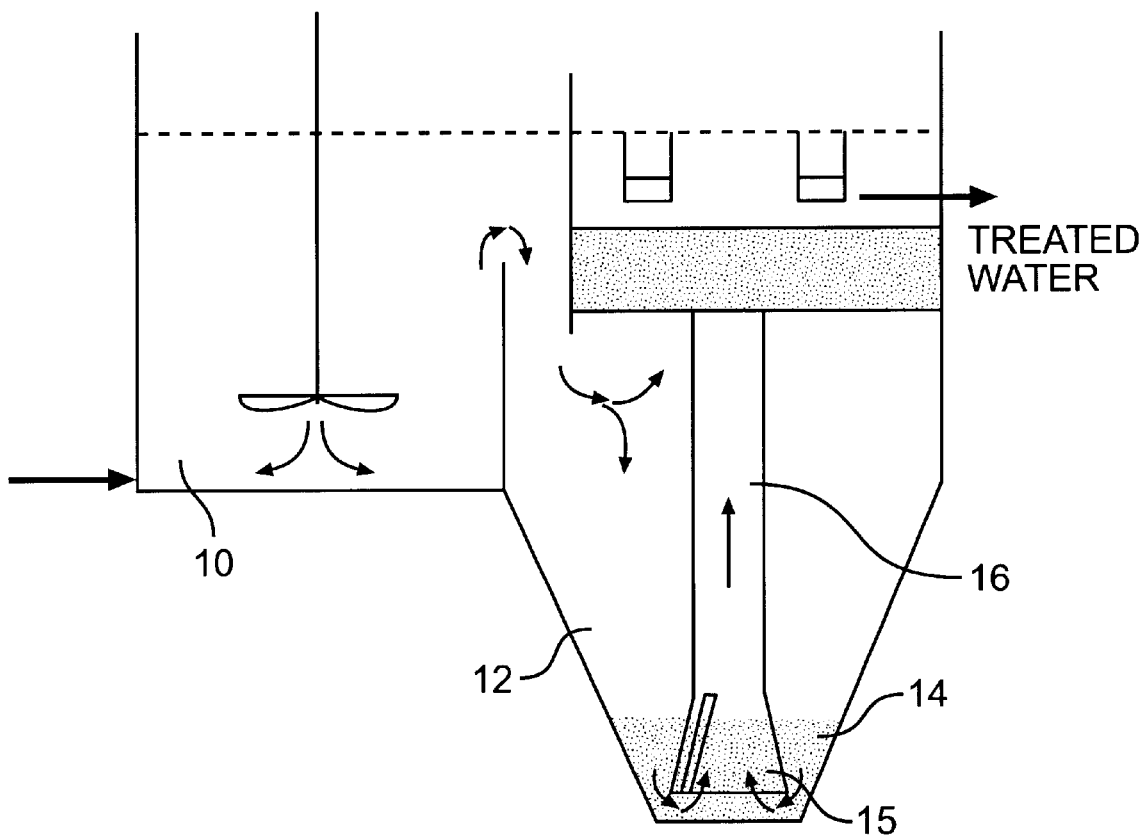
FIG. 3 is a cross section along 3—3 in FIG. 1.

Referring to the drawings and more particularly to FIGS. 1 to 3, these show a water-clarification treatment plant employing the technique of ballasted flocculation. The raw water, which may or may not be pretreated beforehand, is introduced into a flocculator (10) provided with a mixing system, such as a propeller, ensuring that the fluid, the ballast or ballasted floc and the polymer are mixed. Next, the suspension is taken into a settler (12) which, in the embodiment illustrated in the drawing, is a lamellar settler well known to those skilled in the art. According to this ballasted-flocculation process, the ballasted floc which accumulates in the hopper (14) located at the bottom of the settler must be recycled into the flocculator (10), with or without a cleaning sequence.

In the prior art it was seen that the cleaning operation was provided by a hydrocyclone and the drawbacks of this prior solution have been emphasized above.

According to the present invention, two sand-recirculation systems are provided:

- a high-energy system ensuring cleaning of the ballasted floc and draw-off of the sludge, as well as recycling of the cleaned ballast to the flocculation unit. During the operation of this high-energy system, the low-energy system is shut down. This high-energy system is therefore fed with a suspension of ballasted floc which has a sufficient sludge concentration, allowing maximum concentration at draw-off of the sludge;
- a low-energy system ensuring transfer of the ballasted floc to the flocculator as long as the ballast ratio in the flocculator is greater than a predetermined level. The use of this low-energy system, by increasing the amount of sludge in the plant in a controlled manner, makes it possible, at a lower energy cost, to significantly increase the concentration of the drawn-off sludge while still ensuring effective flocculation.

According to the invention, in the embodiment illustrated by FIGS. 1 to 3, the low-energy system comprises a recirculation tube (16) which is placed in the central region for taking up the suspension of ballasted floc in the settler (12), the lower end of the tube (16) being placed in the immediate vicinity of the bottom of the hopper (14) of the settler. In the embodiment illustrated in FIG. 2, this lower end (15) has a frustoconical shape and is preferably provided with calibrated slots such as (13) or holes or orifices which are positioned starting from the base of the tube up to a height exceeding the maximum possible height of the suspension of ballasted floc accumulated in the hopper (14) during a shut-down of the plant. This low-energy system furthermore includes a means for pumping the suspension of ballasted floc through the tube (16). In the embodiment illustrated by FIG. 2, this pumping means is in the form of a propeller (17) placed on the axis of the tube (16). The recirculation tube (16) emerges, at its upper part, in a transfer tube (18) which returns the suspension of ballasted floc to the flocculator (10).

The high-energy system comprises a hydrocyclone (19) and a suction pipe (20) feeding this hydrocyclone, which suction pipe draws off the suspension of ballasted floc at the bottom of the settler (12), in the same region as the recirculation tube (16). This hydrocyclone (19) separates, in a known manner, the ballast from the sludge and recycles the clean ballast to the flocculator (10). Preferably, this high-energy system is positioned above the settler and its suction pipe (20) is placed inside the recirculation tube (16), preferably concentrically with the latter, as illustrated in FIG. 2.

The suction pipe (20) is positioned vertically and equipped with air or water injection devices making it possible to decompact or fluidize the lower part of the recirculation means and ensuring that this same pipe is properly purged. Because of its arrangement, the lower part of the suction pipe (20) is located in a fluidized region of the low-energy system, thereby avoiding any risk of blockage or loss of ballast at the overflow of the hydrocyclone and allowing the hydrocyclone to be frequently stopped and started.

The operation of the apparatus described above will now be described.

During this operation, the raw liquid, which may or may not be pretreated beforehand, into which a ballast or a ballasted floc, as well as a polymer, have been injected, is introduced into a flocculator (10) provided with a mixing system, such as a propeller, and then feeds the settler (12). The ballasted floc is deposited in the bottom of the hopper (14) of the settler, from which it is drawn off by at least one of the two recirculation systems described above.

During shut-downs of the plant, the ballasted floc accumulates at the bottom of the hopper (14) from which it is drawn off in order to be cleaned during a "post shut-down" sequence, after which the ballast is stored in this same hopper (14). During start-ups of the plant, the suspension of ballasted floc (preferably having a high ballast ratio) is taken up by the low-energy system (which is insensitive to the high concentration of this suspension) and recirculated, by the pumping means (17), through the tube (16) and the pipe (18) returning the ballasted floc to the flocculator (10). This low-energy system operates as long as the ballast ratio in the flocculator (10) is above a certain level, that is to say when it is not necessary to clean the ballast. This ballast ratio may be set, for example, at 95%. When the ballast ratio drops below a predetermined limit, for example about 90% (that is to say when the ballast becomes "dirty") the hydrocyclone (19) of the high-energy system is brought into action. It should be noted that, while the hydrocyclone is being brought into operation, the low-energy system remains in service and the ballasted floc sucked up by the hydrocyclone is therefore diluted, thereby eliminating any risk of blockage of the hydrocyclone or of loss of ballast in the overflow. Thereafter, once the hydrocyclone is operating steadily, the low-energy system is shut down.

During this operating phase, the sludge is drawn off relatively concentrated, at the overflow of the hydrocyclone, and the ballast emerges cleaned, at the overflow. This ballast is brought back into the flocculator (10) as may be seen in FIG. 2.

The discontinuous operation of the high-energy system makes it possible for the concentration of the sludge drawn off to be considerably increased.

During the treatment, the two recirculation systems, namely the high-energy and the low-energy system respectively, described above, alternate so as to maintain the ballast ratio at a predetermined level, for example between 90 and 95%. The ballast ratio is measured continuously, for example by turbidimetric techniques, either manually or automatically, "directly" or "indirectly" (the "indirect" measurement consisting, for example, in measuring the turbidity of the water at entry into the station and in calculating therefrom, after a prior "learning period", the amount of sludge that will accumulate on the ballast). In this embodiment of the invention, control of the high-energy/low-energy sequences is slaved to the measurement by a ballast ratio sensor.

According to one particular arrangement of the present invention, the hydrocyclone is controlled so that any anomaly in its operation is signalled by a control parameter. If an anomaly is thus signalled, for example a drop in the recirculation flow rate, which may be detected by a flow meter, the control parameter becomes critical and is used to actuate the low-energy system in order to dilute the ballasted floc at the base of the suction tube (20) of the hydrocyclone, making it possible to obtain a lower concentration and thus preventing any blockage and any loss of ballast.

Figure 4:
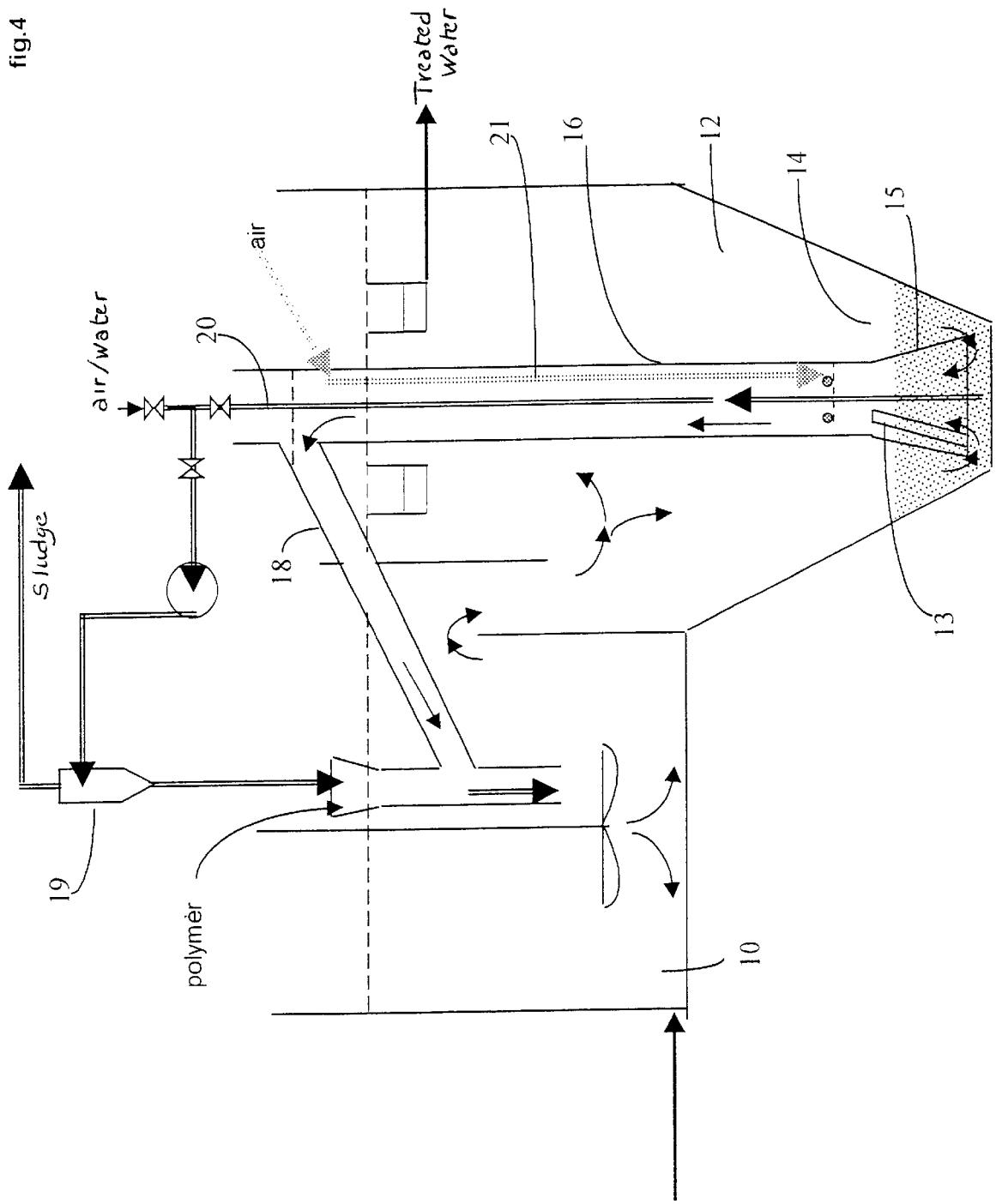
FIG. 4 is a cross section similar to FIG. 2, illustrating an alternative embodiment of the present invention.

In the alternative embodiment shown in FIG. 4, the components of the plant described above with reference to FIGS. 1 to 3, and more particularly to FIG. 2, are again shown and denoted by the same references. It differs from this first embodiment by the fact that the pumping means of the low-energy system are in the form of an air pump system (21) known generally by experts as an "air lift" system. Moreover, the operation of this alternative embodiment is identical to that of the plant illustrated by the previous figures.

Figure 5:
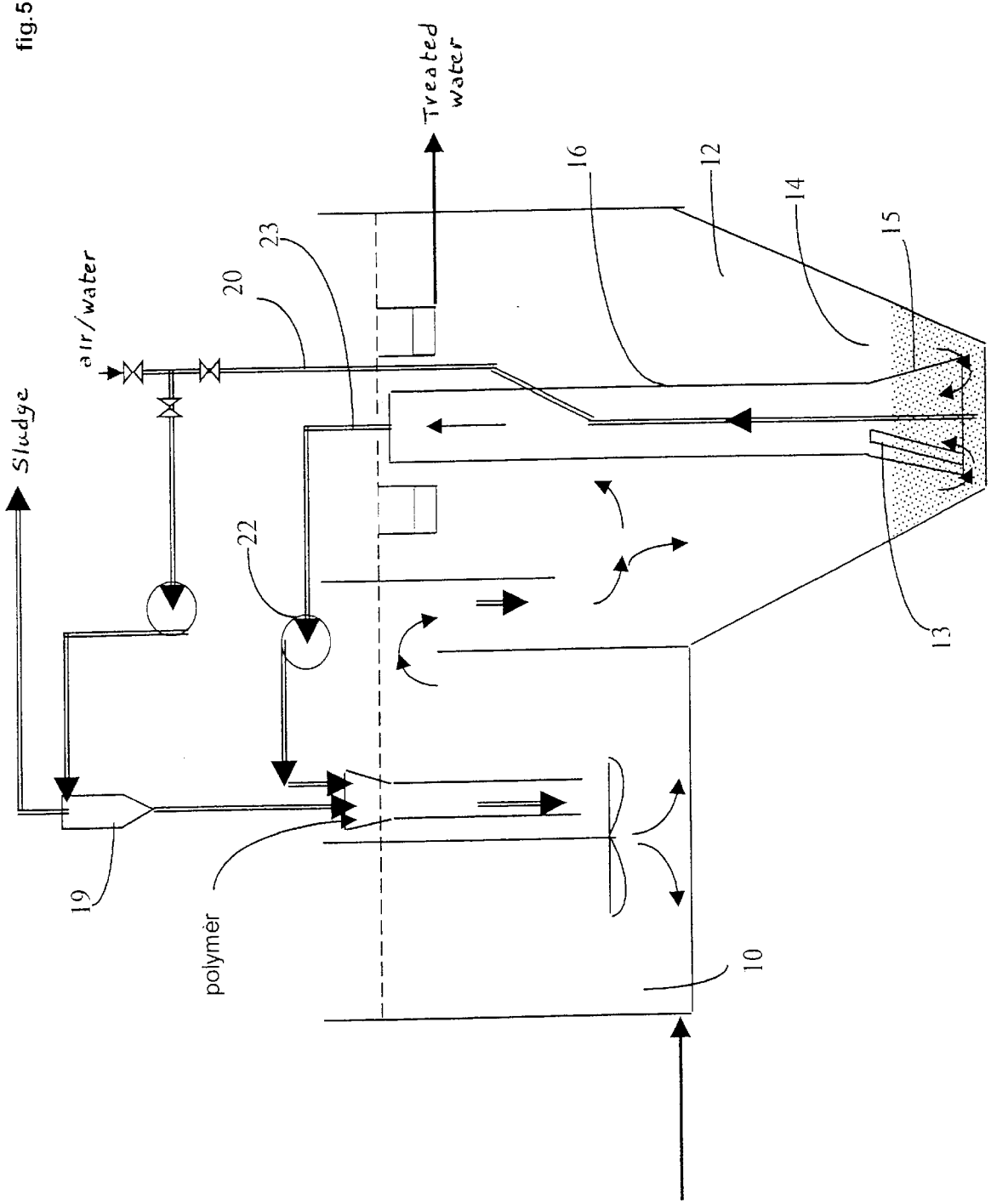
FIG. 5 is also a cross section similar to FIG. 2, illustrating another alternative embodiment of the present invention.

In the alternative embodiment illustrated by FIG. 5, the same components as those of the plants in FIGS. 1 to 4 are again found, but in this second alternative embodiment the pumping means of the low-energy system are in the form of a pump (22) which sucks up the suspension of ballasted floc through the tube (16) via a tube (23).

The advantages afforded by the present invention may be summarized as follows:

a large energy saving: by virtue of the invention, the high-energy system may be taken out of service as long as the ballast ratio in the flocculator is high enough. This system will be shut down for a longer time when the water to be treated has a low content of suspended matter and has a low throughput. In this type of operation, the hydrocyclone will operate only 3 to 10% of the total treatment time. This results in a substantial energy saving. This is because the low-energy system consumes from 0.01 to 0.10 watts per $m^3$ treated by the plant in the case of the embodiment shown in FIGS. 1 to 3 and from 0.1 to 2 watts/$m^3$ in the case of the embodiments shown in FIGS. 4 and 5, whereas the recycling of the suspension by the high-energy system requires 3 to 14 watts per $m^3$ treated by the plant;

better management of start-ups and shut-downs of the clarification plant: the recirculation by the low-energy system allows very concentrated suspensions of ballasted floc to be recirculated. It is therefore possible, by virtue of the present invention, to implement circulation of sand without starting up the hydrocyclone, which would be blocked and would lose ballast, since the concentrations are too high during this sequence, and, without having, at each shut-down, to store the suspension of ballasted floc in a specific high-energy reactor or in the flocculator, the propeller of which would then have to be oversized in order to put the sand back into suspension;

reduction in the downstream sludge-treatment equipment: the sludge drawn off has a higher concentration because of the discontinuous operation of the high-energy system. In the example of the clarification of potable water, according to the invention, the solids content of the drawn-off sludge always remains greater than 2 grams per liter, whereas it is about 0.1 to 2 grams per liter in the case of the ballasted flocculation processes used previously. Thus, the throughput of sludge to be treated, and consequently the loss of water in the plant, can be divided by a factor of 1 to 20;

simplification of the operation, due to the fact that the high-energy system is positioned above the settler and its suction pipe (20) is vertical, its lower part being located in a fluidized region of the low-energy system, thereby making it possible, on the one hand, to minimize the risks of blockage and of loss of ballast, and therefore to facilitate the operation of this clarification treatment process; on the other hand, positioning all the equipment above the water plane makes it possible to dispense with the services duct under the floor of the settler, which duct was essential in the plants according to the prior art.

Of course, it remains the case that the present invention is not limited to the methods of implementation and to the embodiments described and/or mentioned above, but that it encompasses all alternative embodiments thereof.

What is claimed is:

1. A process for the clarification treatment of liquids comprising the steps of:

injecting a granular material ballast and a polymer into an untreated liquid;

flocculating the liquid thereby forming a ballasted floc;

rapidly settling the ballasted floc to form clarified liquid;

selectively recycling uncleaned ballasted floc into the liquid during the previous injecting step by a low energy transfer for so long as a ballast ratio in the ballasted floc is greater than a preselected level, wherein said ballast ratio is expressed as a percentage of clean ballast/(total ballast+sludge);

selectively initiating a high energy cleaning and transfer of the ballasted floc wherein floc, in the form of sludge is removed from cleaned ballast; and the resulting cleaned ballast is recycled into the liquid during the previous injecting step;

wherein the low-energy transfer remains in service while the high energy cleaning and transfer becomes operational, but is shut down during operation of the high energy transfer;

the low and high energy transfers being employed alternately so as to maintain the ballast ratio at the preselected level, wherein the low energy transfer consumes less energy per $m^3$ of liquid treated than the high energy transfer.

2. Process according to claim 1, furthermore comprising a step for continuously measuring the ballast ratio.

3. Process according to claim 2 wherein said measuring of the ballast ratio is a function of the turbidity of the ballasted floc.

4. Process according to claim 1 wherein measuring of the ballast ratio is indirectly achieved by measuring the turbidity of the liquid at the inlet of a liquid treatment station, the amount of sludge building up on the ballast being calculated therefrom.

5. Process according to claim 1 wherein the low energy transfer is used for any startup of a liquid treatment plant so as to recycle the ballasted floc.

* * * * *